United States Patent
Akatsu et al.

(10) Patent No.: US 11,015,055 B2
(45) Date of Patent: May 25, 2021

(54) RESIN COMPOSITION

(71) Applicant: ADEKA CORPORATION, Tokyo (JP)

(72) Inventors: Hiroki Akatsu, Saitama (JP); Takashi Ayabe, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 161 days.

(21) Appl. No.: 16/304,454

(22) PCT Filed: Apr. 27, 2017

(86) PCT No.: PCT/JP2017/016657
§ 371 (c)(1),
(2) Date: Nov. 26, 2018

(87) PCT Pub. No.: WO2017/212816
PCT Pub. Date: Dec. 14, 2017

(65) Prior Publication Data
US 2019/0144671 A1    May 16, 2019

(30) Foreign Application Priority Data
Jun. 9, 2016   (JP) .............................. JP2016-115763

(51) Int. Cl.
C08L 81/02       (2006.01)
C08K 5/3492      (2006.01)
(Continued)

(52) U.S. Cl.
CPC .............. C08L 81/02 (2013.01); B29C 45/00 (2013.01); B29C 45/0001 (2013.01);
(Continued)

(58) Field of Classification Search
CPC ....... C08K 5/3492; C08L 77/00; C08L 67/04; C08L 81/04; C07D 251/24
See application file for complete search history.

(56) References Cited

U.S. PATENT DOCUMENTS

| | | | |
|---|---|---|---|
| 4,286,018 A * | 8/1981 | Asakura | C08G 75/0209 428/332 |
| 5,597,854 A | 1/1997 | Birbaum et al. | |

(Continued)

FOREIGN PATENT DOCUMENTS

| | | |
|---|---|---|
| CN | 1177618 A | 4/1998 |
| CN | 1299391 A | 6/2001 |

(Continued)

OTHER PUBLICATIONS

Rapra (Polyamides as Engineering Thermoplastic Materials: 2.3.7 Summary of Aliphatic Polyamides, Rappa Review Reports, Report 121, vol. 11, 2000, pp. 5-6).*

Adeka (Polymer Additives: Hindered Amine Light Stablizers (HALS). Adeka, 2020, 6 pages).*
Google Patents translation of WO 2016093108 (2016, 18 pages).*
Google Patents translation of JP 2017128679 (2017, 23 pages).*
International Search Report, dated Jul. 11, 2017, from corresponding PCT/JP2017/016657 application.

Primary Examiner — Brieann R Johnston
(74) Attorney, Agent, or Firm — Nixon & Vanderhye

(57) ABSTRACT

A resin composition comprises (A) 100 parts by mass of a resin selected from the group consisting of polyamides, polylactic acids, and polyphenylene sulfides each having a melting point of 170° C. to 370° C., (B) 0.05 to 5.0 parts by mass of a triazine compound represented by the disclosed general formula (1), preferred examples of which are compounds of the formula:

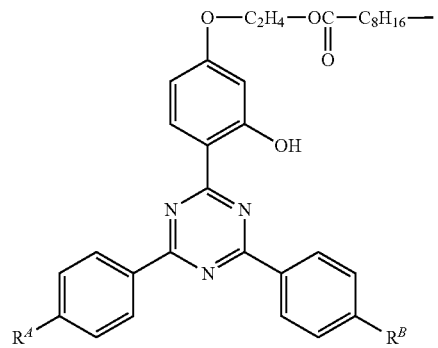

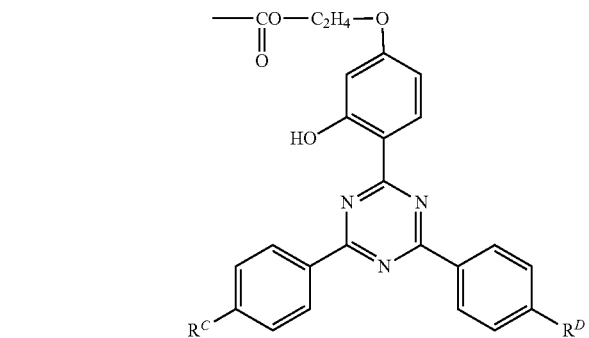

wherein $R^A$, $R^B$, $R^C$, and $R^D$, which may be the same or different, each represent a hydrogen atom or a C1-C4 alkyl group, (C) 0 to 3.0 parts by mass of at least one compound selected from the group consisting of 2,2'-methylenebis[6-(2H-benzotriazol-2-yl)-4-(1,1,3,3-tetramethylbutyl)phenol], 2-[3-hydroxy-4-(4,6-diphenyl-1,3,5-triazin-2-yl)phenoxy] ethyl 2-ethylhexanoate, and 2,4,6-tris(2-hydroxy-4-hexyloxy-3-methylphenyl)-1,3,5-triazine, and (D) 0 to 1.0 part by mass of a light stabilizer being particulate at room temperature (25° C.). The resin composition is useful for making molded articles having improved heat resistance and weatherability.

12 Claims, No Drawings

(51) Int. Cl.

| | | |
|---|---|---|
| *C08L 67/04* | (2006.01) | |
| *C08L 77/00* | (2006.01) | |
| *C08L 101/16* | (2006.01) | |
| *C08K 5/3475* | (2006.01) | |
| *B29C 45/00* | (2006.01) | |
| *B29C 48/00* | (2019.01) | |
| *B29K 67/00* | (2006.01) | |
| *B29K 77/00* | (2006.01) | |
| *B29K 81/00* | (2006.01) | |

(52) U.S. Cl.
CPC .......... *B29C 48/022* (2019.02); *C08K 5/3475* (2013.01); *C08K 5/3492* (2013.01); *C08L 67/04* (2013.01); *C08L 77/00* (2013.01); *C08L 101/16* (2013.01); *B29K 2067/046* (2013.01); *B29K 2077/00* (2013.01); *B29K 2081/04* (2013.01)

(56) References Cited

U.S. PATENT DOCUMENTS

| | | | |
|---|---|---|---|
| 5,736,597 A | 4/1998 | Birbaum et al. | |
| 6,051,164 A | 4/2000 | Samuels | |
| 8,324,296 B2 | 12/2012 | Kaneda et al. | |
| 8,445,602 B2 | 5/2013 | Yao | |
| 2002/0083641 A1 | 7/2002 | Leppard et al. | |
| 2004/0099849 A1 | 5/2004 | Negishi et al. | |
| 2004/0241111 A1 | 12/2004 | Lazzaei et al. | |
| 2005/0075465 A1 | 4/2005 | Bolle et al. | |
| 2007/0161741 A1 | 7/2007 | Ogasawara | |
| 2011/0121245 A1 | 5/2011 | Negishi et al. | |
| 2011/0272648 A1 | 11/2011 | Fukushima et al. | |
| 2015/0284531 A1 | 10/2015 | Aepli et al. | |

FOREIGN PATENT DOCUMENTS

| | | | | |
|---|---|---|---|---|
| CN | 1522275 | A | 8/2004 | |
| CN | 102282206 | A | 12/2011 | |
| CN | 103665989 | A | 3/2014 | |
| CN | 104974513 | A | 10/2015 | |
| EP | 0434608 | A1 * | 6/1991 | ............... C09D 7/48 |
| EP | 1 266 889 | A2 | 12/2002 | |
| JP | 04-154772 | A1 | 5/1992 | |
| JP | 08-225679 | A | 9/1996 | |
| JP | 10-017337 | A | 1/1998 | |
| JP | 10-17557 | A | 1/1998 | |
| JP | 2000-136305 | A | 5/2000 | |
| JP | 2000-300131 | A | 10/2000 | |
| JP | 2001-234059 | A | 8/2001 | |
| JP | 2002-114879 | A | 4/2002 | |
| JP | 2003-041445 | A | 2/2003 | |
| JP | 2005-320409 | A | 11/2005 | |
| JP | 4935479 | B2 | 5/2012 | |
| JP | 2017128679 | A * | 7/2017 | |
| WO | 02/081559 | A1 | 10/2002 | |
| WO | 2004/002213 | A1 | 1/2004 | |
| WO | 2015/168389 | A1 | 11/2015 | |
| WO | 2016/034624 | A1 | 3/2016 | |
| WO | 2016/093108 | A1 | 6/2016 | |

* cited by examiner

RESIN COMPOSITION

TECHNICAL FIELD

This invention relates to a resin composition and a molded product thereof.

BACKGROUND ART

Synthetic resins, such as polyamides, polylactic acids, and polyphenylene sulfides, are widely used in a variety of fields in the form of molded products, fibers, films, and coatings. It is known, however, that molded products made solely of synthetic resins deteriorate under natural light, especially ultraviolet rays, to suffer discoloration and reduction of mechanical strength and therefore do not endure long term use. In order to prevent light deterioration of molding resins, it has been a practice to incorporate one or more members from UV absorbers and light stabilizers into resins.

Among known UV absorbers are triazine compounds. Examples of use of a triazine compound in polyamides, polylactic acids, or polyphenylene sulfides, which are synthetic resins, are described in Patent Literatures 1 to 6 below.

CITATION LIST

Patent Literature

Patent Literature 1: JP 2000-300131A
Patent Literature 2: JP 2001-234059A
Patent Literature 3: JP 2003-041445A
Patent Literature 4: US 2007/161741A
Patent Literature 5: WO 2004/002213
Patent Literature 6: JP 2000-136305A

SUMMARY OF INVENTION

The triazine compounds described in the literature cited above each have insufficient resistance to volatilization and heat. Specifically, they tend to be volatilized by heat in resin processing (e.g., extrusion or injection molding), resulting in the problems of poor heat resistance such as reduction in efficacy and contamination of processing equipment. In outdoor use, the UV absorbers gradually volatilize from the resins, resulting in a failure to exhibit sufficient weatherability.

Accordingly, an object of the invention is to improve heat resistance and weatherability of a resin composition containing an UV absorber.

As a result of diligent studies, the inventers have found an UV absorber that has excellent volatilization resistance and heat resistance and is capable of exerting sufficient effects when added to a resin component selected from polyamides, polylactic acids, and polyphenylene sulfides. The invention has been completed based on this finding.

Specifically, the present invention provides a resin composition comprising:

(A) 100 parts by mass of a resin selected from the group consisting of polyamides, polylactic acids, and polyphenylene sulfides each having a melting point of 170° C. to 370° C., (B) 0.05 to 5.0 parts by mass of a triazine compound represented by general formula (1):

[Chem. 1]

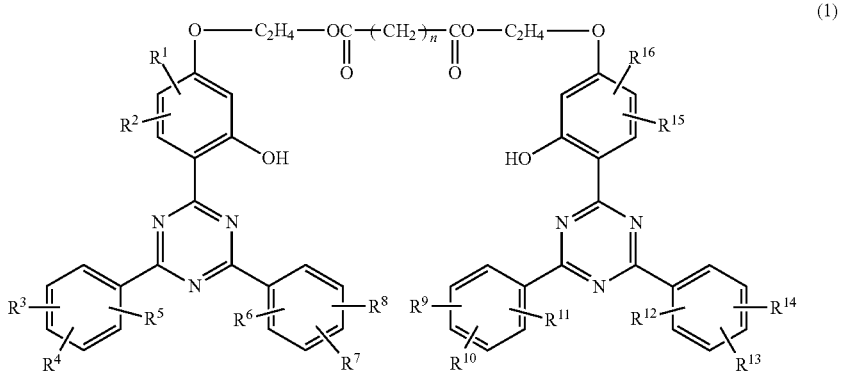

(1)

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ each independently represent a hydrogen atom, a hydroxy group, a halogen atom, an alkyl group having 1 to 20 carbon atoms, an alkenyl group having 2 to 20 carbon atoms, an alkoxy group having 1 to 20 carbon atoms, or an aryl group having 6 to 20 carbon atoms; and n represents an integer 8 to 14, (C) 0 to 3.0 parts by mass of at least one compound selected from the group consisting of 2,2'-methylenebis[6-(2H-benzotriazol-2-yl)-4-(1,1,3,3-tetramethylbutyl)phenol], 2-[3-hydroxy-4-(4,6-diphenyl-1,3,5-triazin-2-yl)phenoxy] ethyl 2-ethylhexanoate, and 2,4,6-tris(2-hydroxy-4-hexyloxy-3-methylphenyl)-1,3,5-triazine, and (D) 0 to 1.0 part by mass of a light stabilizer being particulate at room temperature (25° C.).

The invention also provides molded products containing the resin composition, particularly molded products for household appliances, fisheries, fibers, and automobiles and other vehicles.

DESCRIPTION OF EMBODIMENTS

The invention will be illustrated on the basis of its preferred embodiments.
Component (A)
The resin composition of the invention contains at least one resin selected from polyamides, polylactic acids, and polyphenylene sulfides each having a melting point of 170° C. to 370° C. As used herein, the resin "having a melting point of 170° C. to 370° C." is intended to include a resin having a melting point ranging from 170° C. to 370° C. and a resin having no melting point but a processing temperature ranging from 200° C. to 300° C. The term "melting point" as used herein for a resin denotes a peak temperature of the thermal behavior determined by differential scanning calorimetry at a temperature rise rate of 10° C./min. The term "processing temperature" as used herein for a resin denotes a set temperature of a twin-screw kneader. The term "twin-screw kneader" as used herein refers to an apparatus having two screws rotating in the same or different directions configured to knead a resin and an additive(s) in a predetermined kneading zone.

The polyamides that can be used in the invention have a melting point of 170° C. to 370° C., preferably 170° C. to 350° C., more preferably 215° C. to 320° C. Useful polyamides include polymers obtained from a lactam, an aminocarboxylic acid, a nylon salt prepared from a diamine and a dicarboxylic acid, or a diamine and dibutyl oxalate by known (co)polymerization techniques, such as melt polymerization, solution polymerization, and solid phase polymerization.

Examples of the lactam include ε-caprolactam, ω-enantholactam, ω-laurolactam, α-pyrrolidone, and α-piperidone. These lactams may be used either individually or in combination of two or more thereof.

Examples of the aminocarboxylic acid include 6-aminocaproic acid, 7-aminoheptanoic acid, 9-aminononanoic acid, 11-aminoundodecanoic acid, and 12-aminododecanoic acid. They may be used either individually or in combination thereof.

Examples of the diamine include aliphatic diamines, such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine, and 2,2,4/2,4,4-trimethylhexamethylenediamine; alicyclic diamines, such as 1,3-/1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3-/1,4-bisaminomethylcyclohexane, 5-amino-2,2,4-trimethyl-1-cyclopentanemethylamine, 5-amino-1,3,3-trimethylcylcohexanemethylamine, bis(aminopropyl)piperazine, bis(aminoethyl)piperazine, and norbomanedimethyleneamine; and aromatic diamines, such as m-/p-xylylenediamine. They may be used either individually or in combination thereof.

Examples of the dicarboxylic acid include aliphatic dicarboxylic acids, such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and eicosanedioic acid; alicyclic dicarboxylic acids, such as 1,3-/1,4-cyclohexanedicarboxylic acid, dicyclohexanemethane-4,4'-dicarboxylic acid, and norbomanedicarboxylic acid; and aromatic dicarboxylic acids, such as isophthalic acid, terephthalic acid, 1,4-/1,8-/2,6-/2,7-naphthalenedicarboxylic acid. They may be used either individually or in combination thereof.

Homopolyamides and copolyamides prepared from these starting materials, i.e., the lactam, the aminocarboxylic acid, the diamine/dicarboxylic acid combination, and the diamine/dibutyl oxalate combination may be used either individually or in the form of a polyblend thereof.

Examples of the homopolyamides include polycaprolactam (PA6), polyundecanelactam (PA11), polylaurolactam (PA12), poly(ethylene adipamide) (PA26), poly(tetramethylene succinamide) (PA44), polytetramethyleneglutamide (PA45), poly(tetramethylene adipamide) (PA46), poly(tetramethylene azelamide) (PA49), poly(tetramethylene sebacamide) (PA410), poly(tetramethylene dodecamide) (PA412), poly(pentamethylene succinamide) (PA54), poly(pentamethylene glutamide) (PA55), poly(pentamethylene adipamide) (PA56), poly(pentamethylene azelamide) (PA59), poly(pentamethylene sebacamide) (PA510), poly(pentamethylene dodecamide) (PA512), poly(hexamethylene succinamide) (PA64), poly(hexamethylene glutamide) (PA65), poly(hexamethylenediamino adipamide) (PA66), poly(hexamethylene azelamide) (PA69), poly(hexamethylene sebacamide) (PA610), poly(hexamethylene dodecamide) (PA612), poly(nonamethylene adipamide) (PA96), poly(nonamethylene azelamide) (PA99), poly(nonamethylene sebacamide) (PA910), poly(nonamethylene dodecamide) (PA912), poly(nonamethylene terephthalamide) (PA9T), poly(nanomethylene naphthalimide) (polyamide 9N), poly(decamethylene adipamide) (PA106), poly(decamethylene azelamide) (PA109), poly(decamethylene decamide) (PA1010), poly(decamethylene dodecamide) (PA1012), poly(decamethylene terephthalamide) (polyamide 10T), poly(decamethylene naphthalimide) (polyamide 10N), poly(dodecamethylene diadipamide) (PA126), poly(dodecamethylene azelamide) (PA129), poly(dodecamethylene sebacamide) (PA1210), poly(dodecamethylene dodecamide (PA1212), poly(dodecamethylene terephthalamide) (polyamide 12T), and poly(dodecamethylene naphthamide) (polyamide 12N).

Examples of copolyamides prepared using the lactams, aminocarboxylic acids, diamines, dicarboxylic acids and/or butyl oxalate include a caprolactam/hexamethylene adipamide copolymer (PA6/66), a caprolactam/hexamethylene azelamide copolymer (PA6/69), a caprolactam/hexamethylene sebacamide copolymer (PA6/610), a caprolactam/hexamethylene undecanamide copolymer (PA6/611), a caprolactam/hexamethylene dodecanamide copolymer (PA6/612), a caprolactam/aminoundecanoic acid copolymer (PA6/11), a caprolactam/laurolactam copolymer (PA6/12), a caprolactam/hexamethylene adipamide/laurolactam copolymer (PA6/66/12), a caprolactam/hexamethylene adipamide/hexamethylene sebacamide copolymer (PA6/66/610), a caprolactam/hexamethylene adipamide/hexamethylene dodecanedioamide copolymer (PA6/66/612), PA92/62, PA102/62, and PA122/62. These polyamides may be used either individually or in combination of two or more thereof.

Preferred among them are PA6, PA11, PA12, PA66, and PA9T.

The polylactic acids that can be used in the invention have a melting point of 170° C. to 370° C., preferably 170° C. to 350° C., more preferably 170° C. to 260° C., even more preferably 170° C. to 230° C. The polylactic acids for use in the invention include lactic acid homopolymers, lactic acid copolymers, and polyblends of lactic acid homopolymers and copolymers. A polyblend containing a polylactic acid as a main component may be used as well as long as the effects of the invention are not impaired.

The polystyrene equivalent weight average molecular weight (Mw) of the polylactic acid is usually 50,000 to 500,000, preferably 100,000 to 250,000, as determined by gel permeation chromatography. With an Mw less than 50,000, it is difficult to secure practically required physical properties. With an Mw greater than 500,000, the molding properties can reduce.

The L-lactic acid unit to D-lactic acid unit molar ratio (L/D) of the polylactic acid is not particularly limited and may be selected from the range 100/0 to 1/100. To obtain a resin composition having a high melting point, the polylactic acid preferably contains at least 75 mol % of either L- or D-lactic acid unit. To obtain a resin composition having a still higher melting point, the polylactic acid preferably contains 90 mol % or more of either L- or D-lactic acid unit.

The polylactic acid for use in the invention is preferably a copolymer of lactic acid monomer or lactide and a copolymerizable component. Examples of the copolymerizable component include compounds having two or more ester-forming functional groups, such as dicarboxylic acids, polyhydric alcohols, hydroxycarboxylic acids, and lactone acids; and polyesters, polyethers and polycarbonates prepared from these compounds.

The dicarboxylic acids include succinic acid, adipic acid, azelaic acid, sebacic acid, terephthalic acid, and isophthalic acid.

The polyhydric alcohols include aromatic polyhydric alcohols, such as ethylene oxide adducts of bisphenol; aliphatic polyhydric alcohols, such as ethylene glycol, propylene glycol, butanediol, hexanediol, octanediol, glycerol, sorbitol, trimethylolpropane, and neopentyl glycol; and ether glycols, such as diethylene glycol, triethylene glycol, polyethylene glycol, and polypropylene glycol.

The hydroxycarboxylic acids include glycolic acid, hydroxybutyric acid, hydroxybutylcarboxylic acid, hydroxypentanoic acid, hydroxycaproic acid, and hydroxyheptanoic acid.

The lactone acids include glycolide, ε-caprolactone glycolide, ε-caprolactone, ε-propiolactone, δ-butyrolactone, β-butyrolactone, γ-butyrolactone, pivalolactone and δ-valerolactone.

The polylactic acid for use in the invention is not particularly restricted by the method of synthesis and can be synthesized by a conventionally known method, for example, direct dehydration condensation from a lactic acid monomer or ring-opening polymerization of lactide, i.e., a dimeric cyclic ester of lactic acid.

In carrying out direct dehydration condensation, any of L-lactic acid, D-lactic acid, DL-lactic acid and a mixture thereof may be used. In performing ring-opening polymerization, any of L-lactide, D-lactide, DL-lactide, meso-lactide and a mixture thereof may be used.

The catalyst that can be used in the polymerization reaction in the production of the polylactic acid is not particularly limited, and any catalysts known for lactic acid polymerization may be used. Useful catalysts include tin compounds, such as tin lactate, tin tartrate, tin dicaprylate, tin dilaurate, tin dipalmitate, tin distearate, tin dioleate, tin α-naphthoate, tin β-naphthoate, and tin octylate; tin powder, tin oxide, zinc powder, zinc halides, zinc oxide, organozinc compounds, titanium compounds, such as tetrapropyl titanate, zirconium compounds, such as zirconium isopropoxide, antimony compounds, such as antimony trioxide, bismuth compounds, such as bismuth (III) oxide, and aluminum compounds, such as aluminum oxide and aluminum isopropoxide.

Among them, tin or tin compounds are particularly preferred in view of catalyst activity. The amount of the catalyst to be used is, for example, 0.001 to 5 parts by mass per 100 parts by mass of lactide subjected to ring-opening polymerization.

The polymerization reaction can be carried out in the presence of the catalyst usually at a temperature of from 100° C. to 220° C., while varying depending on the type of the catalyst. It is also preferred to perform the polymerization in two steps as disclosed in JP 7-247345A.

The polyblend containing the polylactic acid as a main component is exemplified by a mixture obtained by blending and melting a lactic acid homopolymer and/or a lactic acid copolymer with an aliphatic polyester other than polylactic acids (hereinafter, simply referred to as "aliphatic polyester"). Blending with the aliphatic polyester is effective in imparting flexibility and impact resistance to molded products to be obtained. The blending ratio of the aliphatic polyester is usually about 10 to 100 parts by mass per 100 parts by mass of the lactic acid homopolymer and/or lactic acid copolymer.

The aliphatic polyester may be a single polymer or a combination of two or more polymers. Examples of the aliphatic polyester include those prepared from an aliphatic carboxylic acid and an aliphatic alcohol and aliphatic hydroxycarboxylic acid polymers obtained by ring-opening polymerization of cyclic anhydrides, such as ε-caprolactone. These polymers may be produced by a direct polymerization method in which a high-molecular weight product is directly obtained by polymerization or an indirect polymerization method in which a monomer is polymerized to an oligomer level, followed by increasing the molecular weight using, e.g., a chain extender. The aliphatic polyester may be a copolymer or a mixture with other resin(s), as long as the main component is the aforementioned aliphatic monomer component.

The aliphatic polyester is preferably a polymer prepared from an aliphatic dicarboxylic acid and an aliphatic diol. Examples of the aliphatic dicarboxylic acid include succinic acid, adipic acid, suberic acid, sebacic acid, dodecanoic acid, and their anhydrides and derivatives. Examples of the aliphatic diol include glycol compounds, such as ethylene glycol, butanediol, hexanediol, octanediol, cyclohexanedimethanol, and their derivatives. It is preferred for each of the aliphatic dicarboxylic acid and the aliphatic diol to contain a C2-C10 alkylene or cycloalkylene. The aliphatic polyester is preferably produced by polycondensation of a monomer component selected from these aliphatic dicarboxylic acids and a monomer component selected from these aliphatic diols. The aliphatic dicarboxylic acids and aliphatic diols each may be used either individually or in combination of two or more thereof.

In order to improve the melt viscosity by introducing a branched structure into the aliphatic polyester, a tri- or higher functional carboxylic acid, alcohol or hydroxycarboxylic acid may be used as a monomer component constituting the polymer. Note that, if such a polyfunctional monomer component is used in a large proportion, the resulting polymer can have a crosslinked structure to lose thermoplasticity or can have, in parts, a highly crosslinked structure called microgel while remaining thermoplastic. Therefore, the polyfunctional monomer component can be used such that it is a small proportion of the resulting polymer and also in an amount so small as not to greatly affect the chemical and physical properties of the resulting polymer. Useful polyfunctional monomer components include malic acid, tartaric acid, citric acid, trimellitic acid, pyromellitic acid, pentaerythritol, and trimethylolpropane.

Among the methods for producing the polymer as the aliphatic polyester, the above described direct polymerization method is a method in which a high-molecular weight product is produced from selected monomer components while removing the water originally present in the monomer components or generated during the polymerization reaction. The above described indirect polymerization method is a method in which selected monomer components are polymerized to an oligomer, which is then processed in the presence of a small amount of a chain extender, for example, a diisocyanate compound, such as hexamethylene diisocyanate, isophorone diisocyanate, xylene diisocyanate, and diphenylmethane diisocyanate, to have increased molecular weight. In addition to these methods, a method for obtaining an aliphatic polyester carbonate using a carbonate compound may be employed.

If necessary, the polylactic acid used in the resin composition of the invention may be blended with a general-purpose resin other than the lactic acid-based polymers with a view to improving impact strength and other properties. The general-purpose resin is preferably a resin having elasticity, such as ethylene-propylene copolymer rubber and an ethylene-propylene-diene copolymer.

The polyphenylene sulfides that can be used in the resin composition of the invention have a melting point of 170° C. to 370° C., preferably 170° C. to 350° C., more preferably 200° C. to 330° C., even more preferably 230° C. to 300° C. Examples of such polyphenylene sulfides include a polyphenylene sulfide having a repeating unit represented by formula (a) shown below. The polyphenylene sulfide preferably contains 70 to 100 mol %, more preferably 80 to 100 mol %, of a p-phenylene group.

[Chem. 2]

(a)

The polyphenylene sulfide having the repeating unit (a) may also have one or more repeating units selected from units represented by formulae (b) shown below, the repeating unit (b) partially replacing the repeating unit (a).

[Chem. 3]

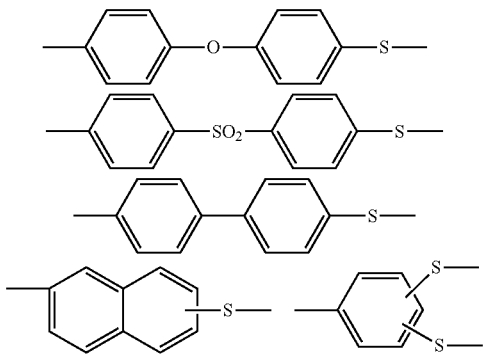
(b)

-continued

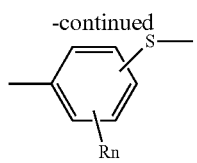

wherein R is a C1-C6 alkyl group; n is an integer of 1 to 4; when n is greater than 1, the plurality of R's may be the same or different.

Examples of the C1-C6 alkyl group as represented by R in the formulae (b) include methyl, ethyl, propyl, isopropyl, butyl, isobutyl, sec-butyl, tert-butyl, pentyl, isopentyl, and hexyl.

The polyphenylene sulfide resins can be produced in a usual manner, for example, by the reaction between a halogen-substituted aromatic compound and an alkali sulfide, the condensation reaction of a thiophenol in the presence of an alkali catalyst or a copper salt, or the condensation reaction between an aromatic compound and sulfur sulfide in the presence of a Lewis acid catalyst. A suitable method for production is selected as appropriate to the structure of a desired polyphenylene sulfide.

If desired, the resin composition of the invention may contain resins other than the polyamides, polylactic aids, or polyphenylene sulfides (hereinafter simply referred to as other resins) as long as the effects of the invention are not ruined. Useful other resins include polycarbonate, polybutylene succinate, polybutylene succinate adipate, poly(ε-caprolactone), biodegradable polyester, polybutylene adipate/terephthalate, polystyrene, acrylonitrile-butadiene-styrene copolymer resins, acrylic resins, polypropylene, polyester, polyphenylene oxide, and modified polyphenylene oxide.

The total content of the other resins, if used, in the resin composition of the invention is preferably not more than 30 parts by mass per 100 parts by mass of component (A) selected from polyamides, polylactic acids, and polyphenylene sulfides.

Component (B)

The triazine compound represented by general formula (1) as component (B) of the resin composition of the invention is used as a UV absorber.

For $R^1$ to $R^{16}$ in formula (1), examples of the halogen atom are fluorine, chlorine, and bromine.

Examples of the C1-C20 alkyl group include methyl, ethyl, propyl, isopropyl, butyl, isobutyl, sec-butyl, tert-butyl, pentyl, isopentyl, hexyl, decyl, dodecyl, and octadecyl.

Examples of the C2-C20 alkenyl group include vinyl, 1-propenyl, isopropenyl, 2-methyl-1-propenyl, 1-butenyl, 2-butenyl, 3-butenyl, 2-ethyl-1-butenyl, 1-pentenyl, 2-pentenyl, 3-pentenyl, 4-pentenyl, 4-methyl-3-pentenyl, 1-hexenyl, 2-hexenyl, 3-hexenyl, 4-hexenyl, and 5-hexenyl.

Examples of the C1-C20 alkoxy group include methoxy, ethoxy, isopropoxy, butoxy, sec-butoxy, tert-butoxy, isobutoxy, amyloxy, isoamyloxy, tert-amyloxy, hexyloxy, 2-hexyloxy, 3-hexyloxy, cyclohexyloxy, 4-methylcyclohexyloxy, heptyloxy, 2-heptyloxy, 3-heptyloxy, isoheptyloxy, tert-heptyloxy, 1-octyloxy, isooctyloxy, and t-octyloxy.

Examples of the C6-C20 aryl group include phenyl, naphthyl, anthracenyl, phenanthryl, fluorenyl, indenyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cylcohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, 4-cyclohexylphenyl, (1,1'-biphenyl)-4-yl, 2,4,5-trimethylphenyl, and ferrocenyl.

$R^1$ through $R^{16}$ are each preferably hydrogen, C1-C4 alkyl, or hydroxyl in terms of compatibility with resins, heat resistance, and resistance to volatilization. $R^1$ to $R^{16}$ may be the same or different from one another.

n is 8 to 14. n is preferably 10 to 12, more preferably 10, in the interests of UV absorptivity, compatibility with resins, and transparency. Component (B) of the resin composition may be a single triazine compound of formula (1) in which n represents a single number or a mixture of two or more triazine compounds having different numbers as n. In the case where component (B) is a mixture of two or more triazine compounds of formula (1), n of a compound that is present in the mixture in the largest amount (in terms of number of moles) represent the number n of the component (B). The number n may be determined by, for example, gel permeation chromatography (GPC) or nuclear magnetic resonance spectroscopy (NMR).

Of the triazine compounds represented by general formula (1), those represented by general formula (2) shown below are preferred for their high UV absorptivity and ease of synthesis (with less by-products).

[Chem. 4]

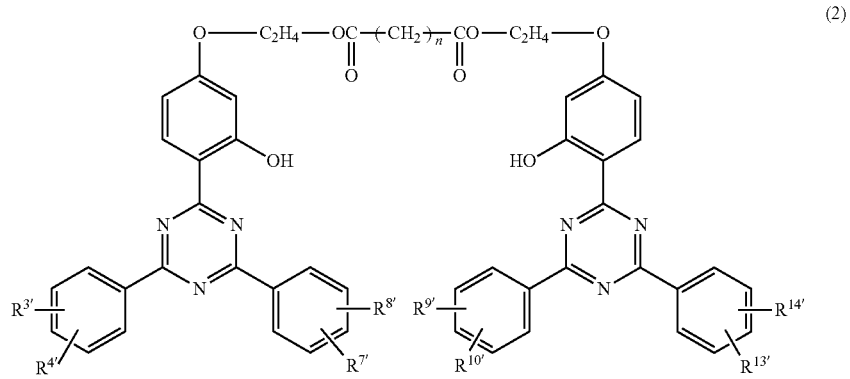

(2)

wherein $R^{3'}$, $R^{4'}$, $R^{7'}$, $R^{8'}$, $R^{9'}$, $R^{10'}$, $R^{13'}$, and $R^{14'}$ each independently represent a hydrogen atom or a C1-C4 alkyl group; and n is as defined in formula (1).

Examples of the C1-C4 alkyl as represented by $R^{3'}$, $R^{4'}$, $R^{7'}$, $R^{8'}$, $R^{9'}$, $R^{10'}$, $R^{13'}$, and $R^{14'}$ in formula (2) include methyl, ethyl, propyl, isopropyl, butyl, isobutyl, sec-butyl, and tert-butyl. $R^{3'}$, $R^{4'}$, $R^{7'}$, $R^{8'}$, $R^{9'}$, $R^{10'}$, $R^{13'}$, and $R^{14'}$ may be the same or different.

Specific examples of the triazine compound of formula (1) used in the invention include compound Nos. 1 through 4A shown below.

[Chem. 5]

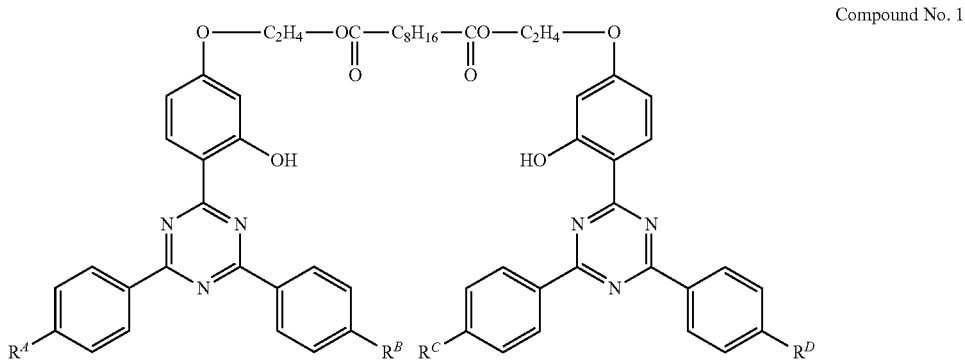

Compound No. 1 wherein $R^A$, $R^B$, $R^C$, and $R^D$, which may be the same or different, each represent a hydrogen atom or a C1-C4 alkyl group.

[Chem. 6]

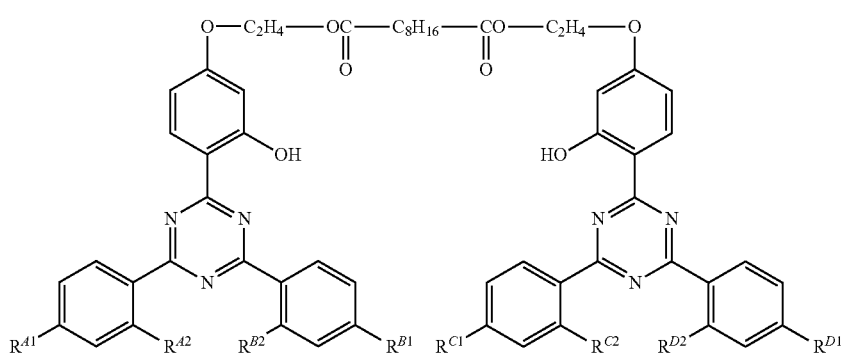

Compound No. 1A wherein $R^{A1}$, $R^{A2}$, $R^{B1}$, $R^{B2}$, $R^{C1}$, $R^{C2}$, $R^{D1}$, and $R^{D2}$ each independently represent a hydrogen atom or a C1-C4 alkyl group.

[Chem. 7]

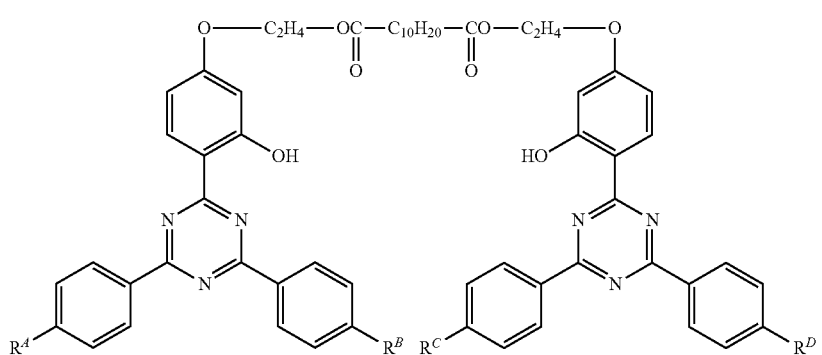

Compound No. 2 wherein $R^A$, $R^B$, $R^C$, and $R^D$ each independently represent a hydrogen atom or a C1-C4 alkyl group.

[Chem. 8]

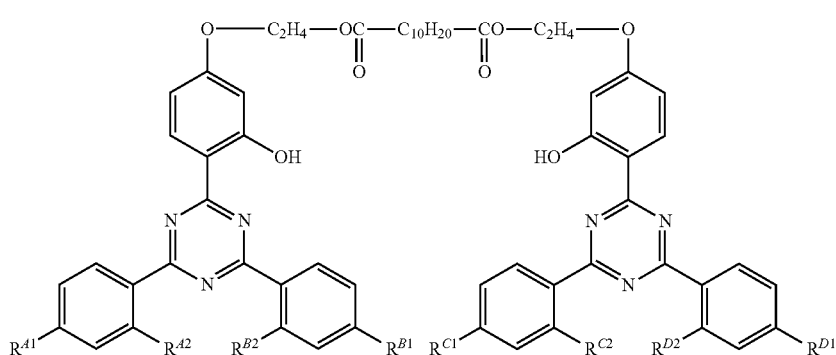

Compound No. 2A wherein $R^{A1}$, $R^{A2}$, $R^{B1}$, $R^{B2}$, $R^{C1}$, $R^{C2}$, $R^{D1}$, and $R^{D2}$ each independently represent a hydrogen atom or a C1-C4 alkyl group.

[Chem. 9]

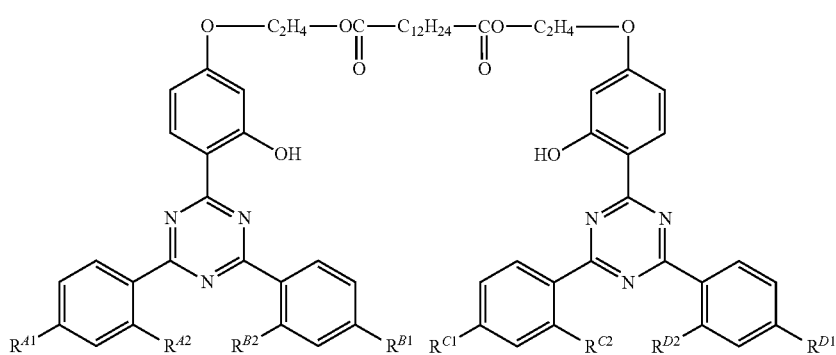

Compound No. 3 wherein $R^A$, $R^B$, $R^C$, and $R^D$ each independently represent a hydrogen atom or a C1-C4 alkyl group.

[Chem. 10]

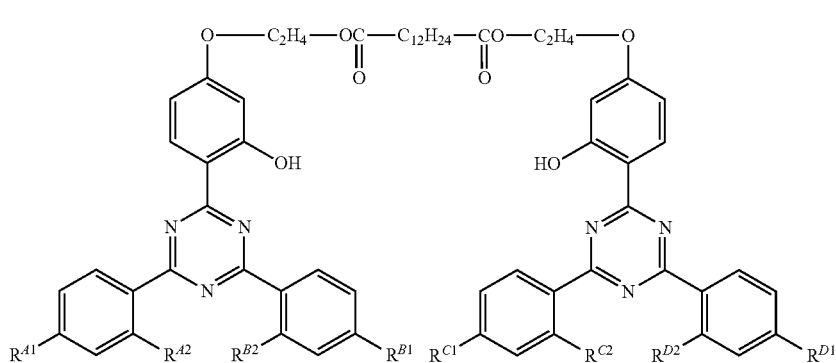

Compound No. 3A wherein $R^{A1}$, $R^{A2}$, $R^{B1}$, $R^{B2}$, $R^{C1}$, $R^{C2}$, $R^{D1}$, and $R^{D2}$ each independently represent a hydrogen atom or a C1-C4 alkyl group.

[Chem. 11]

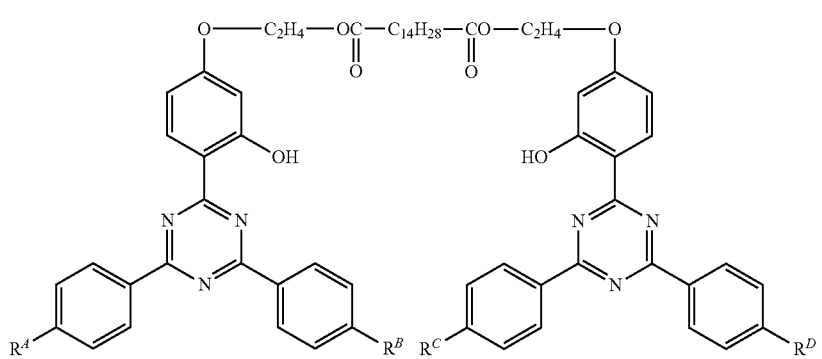

Compound No. 4 wherein $R^A$, $R^B$, $R^C$, and $R^D$ each independently represent a hydrogen atom or a C1-C4 alkyl group.

[Chem. 12]

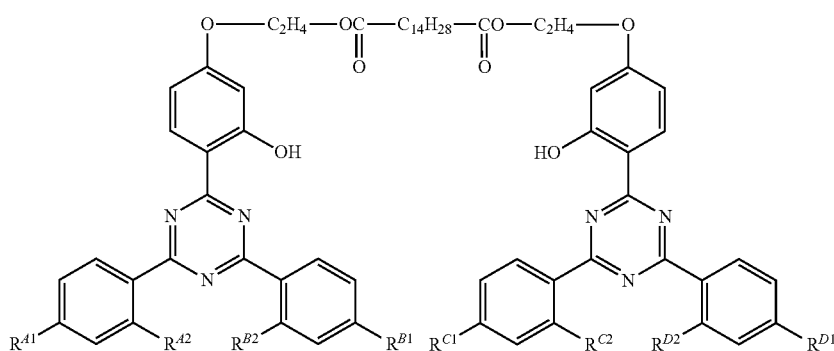

Compound No. 4A wherein $R^{A1}$, $R^{A2}$, $R^{B1}$, $R^{B2}$, $R^{C1}$, $R^{C2}$, $R^{D1}$, and $R^{D2}$ each independently represent a hydrogen atom or a C1-C4 alkyl group.

The triazine compound of formula (1) can be prepared by any known method. For example, compound No. 1 in which $R^A$, $B^B$, $R^C$, and $R^D$ are all hydrogen may be prepared by esterification or interesterification between 2-[2-hydroxy-4-(2-hydroxyethyloxy)phenyl]-4,6-diphenyl-1,3,5-triazine as an alcohol component and an ester-deriving compound of the corresponding dicarboxylic acid, such as a dicarboxylic acid, a dicarboxylic acid dihalide, or a dicarboxylic acid diester. In this case, sebacic acid is used as the corresponding dicarboxylic acid.

The content of the triazine compound as component (B) in the resin composition of the invention is 0.05 to 5.0 parts, preferably 0.1 to 3.0 parts, more preferably 0.15 to 1.0 parts, by mass per 100 parts by mass of component (A) selected from the polyamides, polylactic acids, and polyphenylene sulfides. At a content of at least 0.05 parts by mass, weatherability is developed stably. At a content of 5.0 parts by mass or less, bleed is prevented.

In the case where a resin other than the polyamides, polylactic acids, or polyphenylene sulfides is used in combination as discussed above, the content of the triazine compound is preferably 0.1 to 3.0 parts, more preferably 0.15 to 1.0 parts, by mass per 100 parts by mass of the sum of the polyamide, polylactic acid, and polyphenylene sulfide as component (A) and the other resin(s).

Component (C)

The resin composition of the invention preferably contains at least one member selected from the group consisting of 2,2'-methylenebis[6-(2H-benzotriazol-2-yl)-4-(1,1,3,3-tetramethylbutyl)phenol], 2-[3-hydroxy-4-(4,6-diphenyl-1,3,5-triazin-2-yl)phenoxy]ethyl 2-ethylhexanoate, and 2,4,6-tris(2-hydroxy-4-hexyloxy-3-methylphenyl)-1,3,5-triazine as component (C). Component (C) may be a single compound or a combination of two or more compounds selected from the group described above.

The content of component (C) in the resin composition of the invention is 0 to 3.0 parts, preferably 0.05 to 2.0 parts, more preferably 0.05 to 1.0 parts, by mass per 100 parts by mass of component (A) selected from polyamides, polylactic acids, and polyphenylene sulfides.

Component (D)

The resin composition of the invention preferably contains a light stabilizer as component (D). The light stabilizer to be used in the invention is chosen from those which are particulate (in the form of a powder) at room temperature. Such light stabilizers include tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidinyl) decanedioate, a mixed ester between 1,2,3,4-butanetetracarboxylic acid and 1,2,2,6,6-pentamethyl-4-piperidinol/3,9-bis(2-hydroxy-1,1-dimethylethyl)-2,4,8,10-tetraoxaspiro[5.5]undecane, a mixed ester between 1,2,3,4-butanetetracarboxylic acid and 2,2,6,6-tetramethyl-4-piperidinol/3,9-bis(2-hydroxy-1,1-dimethylethyl)-2,4,8,10-tetraoxaspiro[5.5]undecane, and 2,2,6,6-tetramethyl-4-piperidyl methacrylate. Preferred of them are tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, and bis(2,2,6,6-tetramethyl-4-piperidinyl) decanedioate in terms of resistance to bleed.

The content of the light stabilizer as component (D) in the resin composition of the invention is 0 to 1.0 part, preferably 0.05 to 0.5 parts, more preferably 0.05 to 0.3 parts, by mass per 100 parts by mass of component (A) selected from polyamides, polylactic acids, and polyphenylene sulfides.

Component (E)

The resin composition of the invention preferably contains bis(2,6-di-tert-butyl-4-methylphenyl)pentaerythritol diphosphite, tetrakis[3-(3,5-di-tert-butyl-4-hydroxyphenyl)propionyloxymethyl]methane, or 3,9-bis[2-[3-(3-tert-butyl-4-hydroxy-5-methylphenyl)propanoyloxy]-1,1-dimethylethyl]-2,4,8,10-tetraoxaspiro[5.5]undecane as component (E) in view of processing stability. Component (E) acts as an antioxidant. Component (E) may be a single compound or a combination of two or more compounds selected from the compounds above.

The content of component (E) in the resin composition of the present invention is 0 to 1.0 part, preferably 0.05 to 0.5 parts, more preferably 0.05 to 0.15 parts, by mass per 100 parts by mass of component (A) selected from polyamides, polylactic acids, and polyphenylene sulfides.

If desired, the resin composition of the invention may contain an antioxidant other than component (E), a light stabilizer other than component (D), a triazine ring-containing compound, a metal hydroxide, a phosphoric ester flame retardant, a condensed phosphoric ester flame retardant, a phosphate flame retardant, an inorganic phosphorus flame retardant, a (poly)phosphate flame retardant, a halogen flame retardant, a silicone flame retardant, antimony oxide, an inorganic flame retardant aid, an organic flame retardant aid, an antistatic agent, a lubricant, a nucleating agent, a plasticizer, a parting agent, a compatibilizers, foaming agent, a light absorbing dye, a pigment, a dye, a processing aid, a metal deactivator, inorganic particles, an antibacterial, an antifungal, an extender, a filler, and so forth as long as the effects of the invention are not impaired. A UV absorber other than component (B) or component (C) may also be used as long as the effects of the invention are not impaired. The total content of these additives is preferably up to 10 parts by mass per 100 parts by mass of the sum of component (A) selected from polyamides, polylactic acids, and polyphenylene sulfides, and, if used, other resins (hereinafter inclusively referred to as resinous components).

Examples of the antioxidant other than component (E) include phenol antioxidants, phosphorus antioxidants, and thioether antioxidants.

Examples of useful phenol antioxidants include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene bis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, tetrakis[3-(3,5-di-tert-butyl-4-hydroxyphenyl)propionic acid methyl]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl) propionyloxyethyl] isocyanurate, 3,9-bis[1,1-dimethyl-2-{(3-tert-butyl-4-hydroxy-5-methylphenyl) propionyloxy}ethyl]-2,4,8,10-tetraoxaspiro[5,5]undecane, and triethylene glycol bis[(3-tert-butyl-4-hydroxy-5-methylphenyl)propionate]. The amount of the phenol antioxidant, if added, is preferably 0.001 to 10 parts, more preferably 0.05 to 5 parts, by mass per 100 parts by mass of the resinous components.

Examples of useful phosphorus antioxidants include tris-nonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene 10-oxide, 2,2'-methylenebis (4,6-tert-butylphenyl)-2-ethylhexyl phosphite, 2,2'-methylenebis(4,6-tert-butylphenyl)octadecyl phosphite, 2,2'-ethylidenebis(4,6-di-tert-butylphenyl) fluorophosphite, tris(2-[(2,4,8,10-tetrakis-tert-butyldibenzo[d,f][1,3,2]dioxaphosphepin-6-yl)oxy]ethyl)amine, and phosphite of 2-ethyl-2-butylpropylene glycol and 2,4,6-tri-tert-butylphenol. The amount of the phosphorus antioxidant, if added, is preferably 0.001 to 10 parts, more preferably 0.05 to 5 parts, by mass per 100 parts by mass of the resinous components.

Examples of useful thioether antioxidants include dialkyl thiodipropionates, such as dilauryl thiodipropionate, dimyristyl thiodipropionate, and distearyl thiodipropionate, and a pentaerythritol tetra(β-alkylthiopropionate). The amount of the thioether antioxidant, if added, is preferably 0.001 to 10 parts, more preferably 0.05 to 5 parts, by mass per 100 parts by mass of the resinous components.

The light stabilizer other than component (D) is exemplified by hindered amine light stabilizers. Examples of useful hindered amine light stabilizers include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-tetramethyl-4-piperidyl) sebacate, bis(1-oxtoxy-2,2,6,6-tetramethyl-4-piperidy) sebacate, tetrakis(2,2,6,6-tetramethyl-4-piperidyl) 1,2,3,4-butanetetracarboxylate, tetrakis(24,2,2,6,6-pentamethyl-4-piperidyl) 1,2,3,4-butanetetracarboxylate, bis(2,2,6,6-tetramethyl-4-piperidyl)di(tridecyl) 1,2,3,4-butanetetracarboxylate, bis(1,2,2,6,6-pentamethyl-4-piperidyl)di(tridecyl) 1,2,3,4-butanetetracarboxylate, bis(1,2,2,4,4-pentamethyl-4-piperidyl) 2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, and 1,6,11-tris[2,4-bis(N-butyl-N-(1,2,2,6,6-pentamethyl-4-piperidyl)amino)-s-triazin-6-yl]amino undecane. The amount of the hindered amine light stabilizer, if added, is preferably 0.001 to 30 parts, more preferably 0.05 to 10 parts, by mass per 100 parts by mass of the resinous components.

Examples of useful triazine ring-containing compounds are melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of useful metal hydroxides include magnesium hydroxide, aluminum hydroxide, calcium hydroxide, barium hydroxide, zinc hydroxide, and KISUMA 5A (trade name of magnesium hydroxide manufactured by Kyowa Chemical industry Co., Ltd.).

Examples of useful phosphoric ester flame retardants include trimethyl phosphate, triethyl phosphate, tributyl phosphate, tributoxyethyl phosphate, trichloroethyl phosphate, trisdichloropropyl phosphate, triphenyl phosphate, tricresyl phosphate, cresyl diphenyl phosphate, trixylenyl phosphate, octyl diphenyl phosphate, xylenyl diphenyl phosphate, trisisopropyl phenyl phosphate, 2-ethylhexyl diphenyl phosphate, t-butylphenyl diphenyl phosphate, bis (t-butylphenyl) phenyl phosphate, tris(tert-butylphenyl) phosphate, isopropylphenyl diphenyl phosphate, bis(isopropylphenyl) diphenyl phosphate, and tris(isopropylphenyl) phosphate.

Examples of useful condensed phosphoric ester flame retardants include 1,3-phenylenebis(diphenyl phosphate), 1,3-phenylenebis(dixylenyl phosphate), and bisphenol A bis (diphenyl phosphate).

Examples of useful (poly)phosphate flame retardants include ammonium salts and amine salts of (poly)phosphoric acids, such as ammonium polyphosphate, melamine polyphosphate, piperazine polyphosphate, melamine pyrophosphate, and piperazine pyrophosphate.

Examples of useful inorganic flame retardant aids include inorganic compounds, such as titanium oxide, aluminum oxide, magnesium oxide, hydrotalcite, talc, and montmorillonite, and surface-treated products of these inorganic compounds. Commercially available products of inorganic flame retardant aids may be used, including TIPAQUE R-680 (titanium oxide manufactured by Ishihara Sangyo Kaisha, Ltd.), KYOWAMAG 150 (magnesium oxide manufactured by Kyowa Chemical Industry Co., Ltd.), DHT-4A (hydrotalcite manufactured by Kyowa Chemical Industry Co., Ltd.), and Alcamizer 4 (zinc-modified hydrotalcite manufactured by Kyowa Chemical industry Co., Ltd.).

Examples of useful organic flame retardant aids include pentaerythritol.

Examples of useful antistatic agents include cationic antistatics, such as fatty acid quaternary ammonium ion salts and quaternary polyamine salts; anionic antistatics, such as higher alcohol phosphoric ester salts, higher alcohol EO adducts, polyethylene glycol fatty acid esters, anionic alkylsulfonates, higher alcohol sulfuric ester salts, higher alcohol ethylene oxide-added sulfuric ester salts, and higher alcohol ethylene oxide-added phosphoric ester salts; nonionic antistatics, such as polyhydric alcohol fatty acid esters, polyglycol phosphoric esters, and polyoxyethylene alkyl allyl ethers; and amphoteric antistatics, such as amphoteric alkyl betaines, e.g., alkyl dimethylaminoacetic acid betaine, and amphoteric imidazoline surfactants.

Examples of useful lubricants include hydrocarbon lubricants, such as liquid paraffin, paraffin wax, and polyethylene wax; aliphatic lubricants, such as stearyl alcohol, stearic acid, and 12-hydroxystearic acid; amide lubricants, such as stearamide, oleamide, erucamide, methylenebisstearamide, and ethylenestearamide; metal soap lubricants, such as calcium stearate, zinc stearate, magnesium stearate, lead stearate, aluminum stearate, barium stearate, a barium stearate/zinc stearate composite, and a zinc stearate/calcium stearate composite; and ester lubricants, such as glycerol monostearate, butyl stearate, pentaerythritol stearate, and stearyl stearate.

Examples of useful nucleating agents include dibenzylidene sorbitol, bis(p-methylbenzylidene) sorbitol, bis(p-ethylbenzylidene) sorbitol, aluminum hydroxy-di-(t-butyl benzoate), sodium bis(4-t-butylphenyl)phosphate, and sodium 2,2-methylenebis(4,6-di-t-butylphenyl)phosphate.

Examples of useful plasticizers include phthalic esters, dibasic acid esters, chlorinated paraffin, polyesters, epoxidized esters, phosphoric esters, and trimellitic esters.

Examples of useful extenders include calcium silicate powder, silica powder, talc powder, mica powder, alumina powder, titanium oxide powder, and glass flakes.

Examples of useful fillers include glass fiber and carbon fiber.

Examples of useful UV absorber other than component (B) or component (C) (also referred to as the other UV absorber) include 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl α-cyano-β,β-diphenylacrylate, methyl 2-cyano-3-methyl-3-(p-methoxyphenyl)acrylate, and pentaerythritol tetrakis(2-cyano-3,3-diphenylacrylate); and triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

The amount of the other UV absorber, if used, is preferably not more than 5 parts by mass per 100 parts by mass of the resinous components.

The method for preparing the resin composition of the invention is not particularly limited, and any method known for making a resin composition can be used.

For example, a resinous component, the triazine compound of formula (1), and, if necessary, other additive components are premixed using any of various mixing machines, such as a tumbler mixer and a Henschel mixer, and the resulting mixture is melt kneaded using a Banbury mixer, a roll mill, a Brabender plastograph mixer, a single screw kneading extruder, a twin screw kneading extruder, a kneader, or the like.

The components, part of which may be premixed, may individually be fed through respective feeders to an extruder, where they are melt kneaded to make a resin composition. Part of the components may be premixed, and the mixture is melt kneaded in an extruder to prepare a masterbatch, which can then be mixed and melt kneaded with the rest of the components to prepare a resin composition.

The resin composition of the invention can be molded to make molded products excellent in weatherability and transparency. The molding techniques include, but are not limited to, extrusion, calendering, injection molding, rolling, compression molding, blown film extrusion, and rotational molding. The resin composition can be molded into molded products of various shapes, such as plates, sheets, films, bottles, fibers, and irregular shapes.

The resin composition of the invention and the molded products thereof find wide applications in various fields, including electric & elecronics, communications, fisheries, mining, construction, foods, fibers, clothing, remedy, coal, petroleum, rubber, leather, automobiles, precision equipment, lumber, building materials, civil engineering, furniture, printing, musical instruments, and so on. They are particularly useful in the fields of household appliances, fisheries, fibers, and automobiles and other vehicles.

Applications to household appliances include lighting equipment, housings of electronics, electronic circuit board covers, cellular phones, personal computers, memory cards, memory card connectors, switches, and relays. Resin compositions containing a polyamide resin, such as PA9T, a polylactic acid, or a polyphenylene sulfide, and molded products thereof are suitable for these applications.

Applications to fisheries include mono- and multifilaments for fishing nets and fishing lines and ultrahigh-strength materials for fishery. Resin compositions containing a polyamide resin, such as PA6, PA12, PA66, or PA9T, and molded products thereof are suitable for these applications.

Applications to fibers include stockings, clothing fibers, leggings, stirrup leggings, foot covers, grass cutter cords, textiles, metal composite yarns, binding strands, strings for sports rackets, wovens, knits, hollow threads, strings for stringed instruments, and filters. Resin compositions containing a polyamide, such as PA6, PA12, PA66, or PA9T, and molded products thereof are suitable for these applications.

Applications to automobiles and other vehicles include automotive interior and exterior trim, automotive underhood parts, bicycle parts, bearing retainers, sealants, head lamps, actuator gears, intercooler tanks, radiator hoses, radiator parts, parts in engine compartments, and wire harness connectors. Resin compositions containing a polyamide, such as PA6, PA66, or PA9T, or a polyphenylene sulfide and molded products thereof are suitable for these applications.

EXAMPLES

The invention will now be illustrated in greater detail with reference to Synthesis Examples, Examples, and Comparative Examples. It should be understood that the invention is not deemed to be limited thereby. Unless otherwise noted, all the parts are by mass.

Synthesis Example 1—Synthesis of Compound No. 1-1

A 1000 ml five-necked flask was fitted with a stirrer, a nitrogen inlet, a thermometer, a fractionating column, and a stopper (for sampling), and the top of the fractionating column was fitted with a distilling receiver and a condenser. The system thus provided was used as a reaction equipment. In the flask were put 86 g (0.2 mol) of 2-[2-hydroxy-4-(2-hydroxyethyloxy)phenyl]-4,6-diphenyl-1,3,5-triazine as an alcohol component (a starting material), 20 g (0.1 mol) of sebacic acid as a dicarboxylic acid component (another starting material), 300 g of xylene as a solvent, and 0.2 g (1 mmol) of sodium p-toluenesulfonate monohydrate as an esterification catalyst, and heated at 130° C. under atmospheric pressure to conduct esterification reaction while driving produced water out of the reaction system. The esterification reaction was ceased when the starting materials reduced to less than 1% as analyzed by HPLC. The reaction mixture was worked up by cooling for crystallization, followed by filtration to give compound No. 1-1. Compound No. 1-1 is one of Compound No. 1 in which $R^A$, $R^B$, $R^C$, and $R^D$ are all hydrogen. The product was identified to be compound No. 1-1 using a high performance liquid chromatograph (HPLC) manufactured by JASCO Corp. under conditions of a solvent of acetonitrile/water=95/5 (by volume), a flow rate of 1 ml/min, and a UV detection wavelength of 254 nm. The results of HPLC identification are as follows. The retention time of the desired product was 24.2 min.

Synthesis Example 2—Synthesis of Compound No. 2-1

An esterification reaction and working-up procedures were carried out in the same manner using the same reaction equipment as used in Synthesis Example 1, except for replacing the starting dicarboxylic acid component with 23 g (0.1 mol) of dodecanedioic acid, to prepare Compound No. 2-1, which is one of Compound No. 2 in which $R^A$, $R^B$, $R^C$, and $R^D$ are all hydrogen. Identification of the product was carried out in the same manner as in Synthesis Example 1. The retention time of the desired product was 30.4 min.

Synthesis Example 3—Synthesis of Compound No. 2A-1

An esterification reaction and working-up procedures were carried out in the same manner using the same reaction equipment as used in Synthesis Example 1, except for replacing the starting alcohol component with 88 g (0.2 mol) of 2-[2-hydroxy-4-(2-hydroxyethyloxy)phenyl]-4,6-bis(2,4-dimethylphenyl)-1,3,5-triazine, to prepare Compound No. 2A-1, which is one of Compound No. 2A in which $R^{A1}$, $R^{A2}$, $R^{B1}$, $R^{B2}$, $R^{C1}$, $R^{C2}$, $R^{D1}$, and $R^{D2}$ are all methyl. The product was identified in the same manner as in Synthesis Example 1. The retention time of the desired product was 27.6 min.

Synthesis Example 4—Synthesis of Compound No. 3-1

An esterification reaction and working-up procedures were carried out in the same manner using the same reaction equipment as used in Synthesis Example 1, except for replacing the starting dicarboxylic acid component with 26 g (0.1 mol) of tetradecanedioic acid, to prepare Compound No. 3-1, which is one of Compound No. 3 in which $R^A$, $R^B$, $R^C$ and $R^D$ are all hydrogen. The product was identified in the same manner as in Synthesis Example 1. The retention time of the desired product was 36.5 min.

Synthesis Example 5—Synthesis of Compound No. 4-1

An esterification reaction and working-up procedures were carried out in the same manner using the same reaction equipment as used in Synthesis Example 1, except for replacing the starting dicarboxylic acid component with 29 g (0.1 mol) of hexadecanedioic acid, to prepare Compound No. 4-1, which is one of Compound No. 4 in which $R^A$, $R^B$, $R^C$, and $R^D$ are all hydrogen. The product was identified in the same manner as in Synthesis Example 1. The retention time of the desired product was 40.2 min.

The triazine compounds prepared in Synthesis Examples 1 to 5 were analyzed to determine maximum absorption wavelength ($\lambda_{max}$), absorbance ($A\lambda_{max}$), and molar extinction coefficient ($\varepsilon\lambda_{max}$) using a spectrophotometer V670 (manufactured by JASCO Corp.). In the analysis, chloroform was used as a solvent, and the sample concentration was 10 mg/l. The results obtained are shown in Table 1 below.

TABLE 1

| Synthesis Example No. | Component (B) Compound No. | Results of Analysis | | |
|---|---|---|---|---|
| | | $\lambda_{max}$ | $A_{\lambda max}$ | $\varepsilon_{\lambda max}$ |
| 1 | 1-1 | 278 | 0.91 | $8.52 \times 10^4$ |
| 2 | 2-1 | 278 | 0.95 | $8.65 \times 10^4$ |
| 3 | 2A-1 | 290 | 0.84 | $7.66 \times 10^4$ |
| 4 | 3-1 | 278 | 0.88 | $8.57 \times 10^4$ |
| 5 | 4-1 | 278 | 0.80 | $7.75 \times 10^4$ |

Examples 1 to 26 and Comparative Examples 1 to 7

Preparation of Specimens:

A hundred parts of the resin shown in Table 2 and 3 below as component (A) was blended with each of the triazine compounds obtained in Synthesis Examples 1 through 5 as component (B) and Comparative Compounds 1 to 3 shown below in the amount shown in Tables 2 and 3, and 0.03 parts of liquid paraffin was added to the blend. The resulting mixture was kneaded in an extruder (Labo-plastomill μ, manufactured by Toyo Seiki Seisakusho, Ltd.) at 280° C. and pelletized. The pellets were injection molded at a processing temperature commonly recommended for the resin to make 1 mm thick specimens. The specimens were subjected to the following evaluation. The results obtained are shown in Tables 2 and 3. Commonly recommended processing temperatures are 220° C. for polyamide 12 (PA12), 280° C. for polyamide 6 (PA6), 295° C. for polyamide 66 (PA66), 340° C. for polyamide 9T (PA9T), 320° C. for polyphenylene sulfides (PPS), and 230° C. for polylactic acids (PLA).

[Chem. 13]

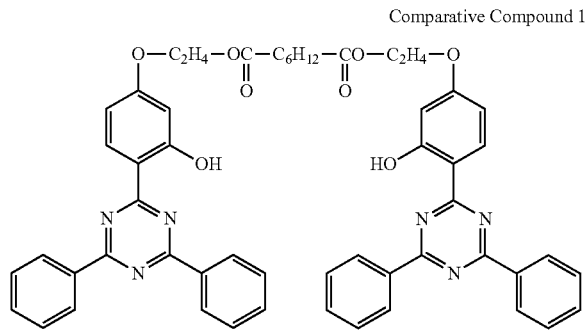

Comparative Compound 1

Comparative Compound 2: 2-(4,6-diphenyl-1,3,5-triazin-2-yl)-5-hexyloxyphenol

[Chem. 14]

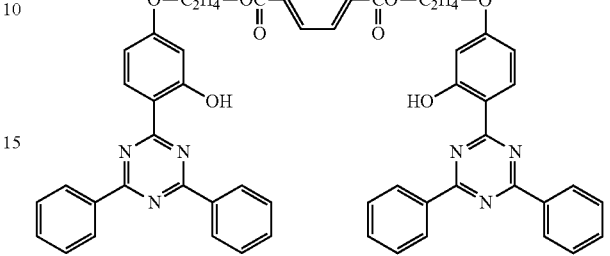

Comparative Compound 3

Volatilization Resistance:

The specimen was maintained for 0.5 hours at a processing temperature commonly recommended for the resin used in a nitrogen atmosphere and then weighed. The volatilization resistance was evaluated by the weight loss percentage (%) as calculated according to the following formula:

Weight loss percentage (%)=[(weight loss of specimen under analysis after maintained for 0.5 hours at processing temperature commonly recommended for the resin)/(weight of specimen under analysis immediately after injection molding)×100]−[(weight loss of specimen containing no additive after maintained for 0.5 hours at processing temperature commonly recommended for the resin)/(weight of specimen containing no additive immediately after injection molding)×100]

Commonly recommended processing temperatures are 220° C. for polyamide 12 (PA12), 280° C. for polyamide 6 (PA6), 295° C. for polyamide 66 (PA66), 340° C. for polyamide 9T (PA9T), 320° C. for polyphenylene sulfides (PPS), and 230° C. for polylactic acids (PLA).

TABLE 2

| | Component (A) (part) | Component (B) (part) | Component (C) (part) | Component (D) (part) | Component (E) (part) | Volatilization Resistance |
|---|---|---|---|---|---|---|
| Example 1 | PA9T*[1] | 1-1 (0.5) | — | — | — | −0.51 |
| Example 2 | (100) | 2-1 (0.1) | — | — | — | −0.19 |
| Example 3 | | 2-1 (0.3) | — | — | — | −0.32 |
| Example 4 | | 2-1 (0.5) | — | — | — | −0.49 |
| Example 5 | | 2-1 (1.0) | — | — | — | −0.56 |
| Example 6 | | 2-1 (3.0) | — | — | — | −0.78 |
| Example 7 | | 2A-1 (0.5) | — | — | — | 0.50 |
| Example 8 | | 3-1 (0.5) | — | — | — | −0.51 |
| Example 9 | | 4-1 (0.5) | — | — | — | −0.50 |
| Example 10 | | 2-1 (0.5) | — | — | *2 (0.15) | −0.07 |
| Example 11 | | 2-1 (0.5) | — | — | *2 (0.075) *3 (0.075) | −0.80 |
| Example 12 | | 2-1 (0.4) | *4 (0.1) | — | — | −0.02 |
| Example 13 | | 2-1 (0.25) | *4 (0.25) | — | — | −0.02 |
| Example 14 | | 2-1 (0.1) | *4 (0.4) | — | — | −0.94 |
| Example 15 | | 2-1 (0.25) | *5 (0.25) | — | — | −0.01 |
| Example 16 | | 2-1 (0.25) | *6 (0.25) | — | — | −0.38 |
| Example 17 | | 2-1 (0.25) | *4 (0.25) | *7 (0.1) | — | 0.02 |
| Example 18 | | 2-1 (0.25) | *4 (0.25) | *7 (0.3) | — | −0.03 |
| Example 19 | | 2-1 (0.25) | *4 (0.25) | *7 (1.0) | — | −0.31 |
| Example 20 | | 2-1 (0.25) | *4 (0.25) | *8 (0.3) | — | −0.06 |
| Example 21 | | 2-1 (0.25) | *4 (0.25) | *9 (0.3) | — | −0.06 |
| Comp. Example 1 | | 2-1 (0.01) | — | — | — | −0.02 |

TABLE 2-continued

|  | Component (A) (part) | Component (B) (part) | Component (C) (part) | Component (D) (part) | Component (E) (part) | Volatilization Resistance |
|---|---|---|---|---|---|---|
| Comp. Example 2 |  | 2-1 (0.5) | — | — | *10 (0.15) | −1.00 |
| Comp. Example 3 |  | 2-1 (0.25) | *4 (0.25) | *7 (10.0) | — | −1.02 |
| Comp. Example 4 |  | 2-1 (10.0) | — | — | — | −1.51 |
| Comp. Example 5 |  | *11 (0.5) | — | — | — | −1.10 |
| Comp. Example 6 |  | *12 (0.5) | — | — | — | −1.12 |
| Comp. Example 7 |  | *13 (0.5) | — | — | — | −1.13 |

*1* Genestar TA112 manufactured by Kuraray Co., Ltd.
*2: Bis(2,6-di-tert-butyl-4-methylphenyl)pentaerythritol diphosphite
*3: Tetrakis(3-(3,5-di-tert-butyl-4-hydroxyphenyl)propionyloxymethyl)methane
*4: 2,2'-Methylenebis[6-(2H-benzotriazol-2-yl)-4-(1,1,3,3-tetramethylbutyl)phenol]
*5: 2-[3-Hydroxy-4-(4,6-diphenyl-1,3,5-triazin-2-yl)phenoxy]ethyl 2-ethylhexanoate
*6: 2,4,6-Tris(2-hydroxy-4-hexyloxy-3-methylphenyl)-1,3,5-triazine
*7: Tetrakis(2,2,6,6-tetramethyl-4-piperidyl) 1,2,3,4-butanetetracarboxylate
*8: Tetrakis(1,2,2,6,6-pentamethyl-4-piperidyl) 1,2,3,4-butanetetracarboxylate
*9: Bis(2,2,6,6-tetramethyl-4-piperidinyl) decanedioate
*10: Tris(2,4-di-tert-butylphenyl) phosphite
*11: Comparative Compound 1
*12: Comparative Compound 2
*13: Comparative Compound 3

Comparative Example 1 was good in volatilization resistance but considerably poor in weatherability. Specifically, in weather testing with water spray at 65° C. for 600 hours using Atlas Ci4000 Weather-Ometer manufactured by Atlas Inc., the specimen cracked, showing the same results as with the resin containing no additive.

TABLE 3

|  | Component (A) (part) | Component (B) (part) | Component (C) (part) | Component (D) (part) | Component (E) (part) | Volatilization Resistance |
|---|---|---|---|---|---|---|
| Example 22 | PA12*14 (100) | 2-1 (0.5) | — | — | — | −0.22 |
| Example 23 | PA6*15 (100) | 2-1 (0.5) | — | — | — | −0.07 |
| Example 24 | PA66*16 (100) | 2-1 (0.5) | — | — | — | −0.34 |
| Example 25 | PLA*17 (100) | 2-1 (0.5) | — | — | — | −0.24 |
| Example 26 | PPS*18 (100) | 2-1 (0.5) | — | — | — | −0.28 |

*14 UBESTA 3014B manufactured by Ube Industries, Ltd.
*15 UBE Nylon 1015B manufactured by Ube Industries, Ltd.
*16 UBE Nylon 2020B manufactured by Ube Industries, Ltd.
*17 Ingeo 2003D manufactured by Nature Works
*18 Torelina A900 manufactured by Toray Industries, Inc.

INDUSTRIAL APPLICABILITY

The invention provides a UV absorber-containing resin composition having improved heat resistance and weatherability without suffering performance reduction or causing contamination of processing equipment during processing.

The invention claimed is:

1. A resin composition comprising:
(A) 100 parts by mass of a resin selected from the group consisting of polyamides, polylactic acids, and polyphenylene sulfides each having a melting point of 170° C. to 370° C., (B) 0.05 to 5.0 parts by mass of a triazine compound represented by general formula (1):

[Chem. 1]

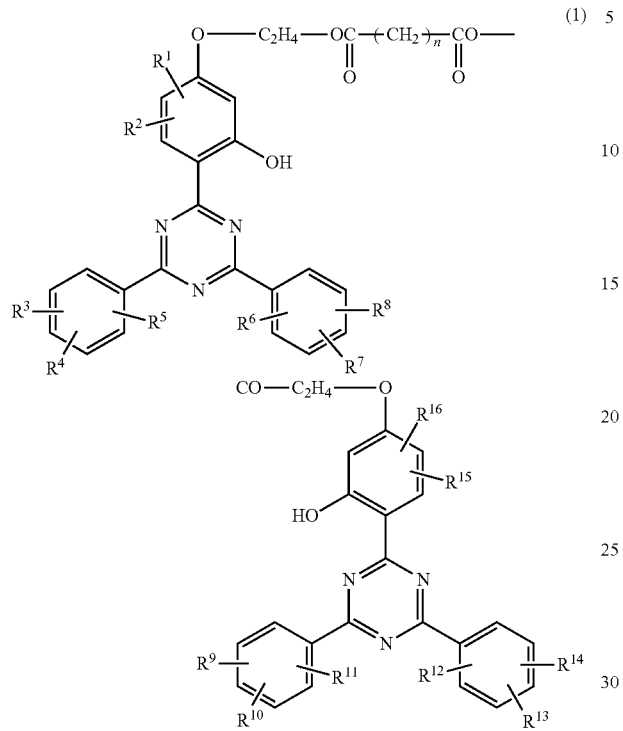

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ each independently represent a hydrogen atom, a hydroxy group, a halogen atom, an alkyl group having 1 to 20 carbon atoms, an alkenyl group having 2 to 20 carbon atoms, an alkoxy group having 1 to 20 carbon atoms, or an aryl group having 6 to 20 carbon atoms; and n represents an integer 8 to 14, (C) 0 to 3.0 parts by mass of at least one compound selected from the group consisting of 2,2'-methylenebis[6-(2H-benzotriazol-2-yl)-4-(1,1,3,3-tetramethylbutyl)phenol], 2-[3-hydroxy-4-(4,6-diphenyl-1,3,5-triazin-2-yl)phenoxy]ethyl 2-ethylhexanoate, and 2,4,6-tris(2-hydroxy-4-hexyloxy-3-methylphenyl)-1,3,5-triazine, and (D) 0 to 1.0 part by mass of a light stabilizer being particulate at room temperature (25° C.).

2. The resin composition according to claim 1, wherein component (B) is represented by general formula (2):

[Chem. 2]

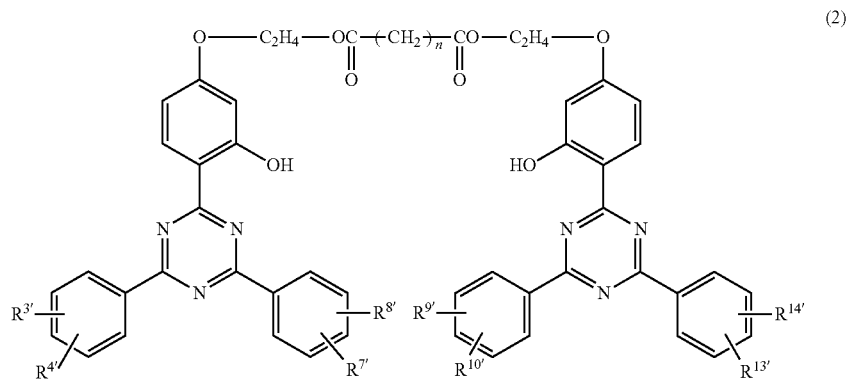

wherein $R^{3'}$, $R^{4'}$, $R^{7'}$, $R^{8'}$, $R^{9'}$, $R^{10'}$, $R^{13'}$, and $R^{14'}$ each independently represent a hydrogen atom or an alkyl group having 1 to 4 carbon atoms; and n is as defined in general formula (1).

3. The resin composition according to claim 1, further comprising:
   (E) 0 to 1.0 part by mass of at least one compound selected from the group consisting of bis(2,6-di-tert-butyl-4-methylphenyl)pentaerythritol diphosphite, tetrakis[3-(3,5-di-tert-butyl-4-hydroxyphenyl)propionyloxymethyl]methane, and 3,9-bis[2-[3-(3-tert-butyl-4-hydroxy-5-methylphenyl)propanoyloxy]-1,1-dimethylethyl]-2,4,8,10-tetraoxaspiro[5.5]undecane.

4. A molded product comprising the resin composition according to claim 1.

5. A household appliance comprising the molded product according to claim 4.

6. A fishery comprising the molded product according to claim 4.

7. A fiber comprising the molded product according to claim 4.

8. A vehicle comprising the molded product according to claim 4.

9. The resin composition according to claim 2, further comprising:
   (E) 0 to 1.0 part by mass of at least one compound selected from the group consisting of bis(2,6-di-tert-butyl-4-methylphenyl)pentaerythritol diphosphite, tetrakis[3-(3,5-di-tert-butyl-4-hydroxyphenyl)propionyloxymethyl]methane, and 3,9-bis[2-[3-(3-tert-butyl-4-hydroxy-5-methylphenyl)propanoyloxy]-1,1-dimethylethyl]-2,4,8,10-tetraoxaspiro[5.5]undecane.

10. A molded product comprising the resin composition according to claim 2.

11. A molded product comprising the resin composition according to claim 3.

12. A molded product comprising the resin composition according to claim 9.

* * * * *